— 3,257,458
PROCESS FOR THE PRODUCTION OF OCTENE-(4)-DIONE-(2,7)
Hans-Joachim Kabbe, Leverkusen, Karl Eiter, Cologne-Stammheim, and Ernst Truscheit, Leverkusen, Germany, assignors to Farbenfabriken Bayer Aktiengesellschaft, Leverkusen, Germany, a corporation of Germany
No Drawing. Filed Jan. 9, 1962, Ser. No. 165,239
Claims priority, application Germany, Jan. 28, 1961, F 33,091
4 Claims. (Cl. 260—594)

This invention relates to octene-(4)-dione-(2,7) and to methods for producing the same. More particularly, the present invention is concerned with octene-(4)-dione-(2,7), a valuable intermediate, known heretofore, and used in the preparation of carotinoids, terpenes, and polyenes; as well as to novel procedures for producing octene-(4)-dione-(2,7) in enhanced and substantial yields unknown heretofore.

Octene-(4)-dione-(2,7) was suggested and its preparation described by P. Karrer et al., Helvetica Chimica Acta, vol. 32, p. 1934 (1949), and involved the condensation of glyoxal with acetoacetic acid to form octadiene-(3,5)-dione-(2,7); the latter compound being reduced with zinc and glacial acetic acid in pyridine. The yields, however, utilizing this technique amount to approximately 4 percent; and even this yield has been obtained only when very critical conditions of reaction are maintained.

More recently, Inhoffen et al., Chem. Ber., vol. 84, p. 83 (1951) has obtained octadiene-(3,5)-dione-(2,7) by a method which involves oxidatively linking 2 mols of butyne-(1)-ol-(3) to form octadiyne-(3,5)-diol-(2,7), which in turn is hydrogenated in the form of the dibenzoate to form octadiene-(3,5)-diol-(2,7)-dibenzoate. Saponification of this latter compound, followed by oxidation with tertiary butyl chromate yields octadiene-(3,5)-dione-(2,7) as described further in German Patent 835,144. The yield of the aforesaid octadiene in terms of the butyne-(1)-ol reactant is, however, less than 1 percent for this latter technique.

Even more recently Weedon et al. has reported in the Journal of the American Chemical Society, 1952, p. 4089, a simplification of the aforesaid process of Inhoffen et al. which effected an increase in the yield of octadiene-(3,5)-diol-(2,7) of 15 percent to 20 percent. The Weedon et al. process dispensed with the formation of the dibenzoate; the reduction step being effected with lithium aluminum hydride, to form octadiene-(3,5)-diol-(2,7); the latter compound being then oxidized to form the corresponding dione with manganese dioxide.

The yields, even of the more recently evolved procedures described hereinabove are, however, severely limited. The dimensions of this limitation are even more apparent when it is considered that the product evolved and for which the yields are given hereinabove, is not the desired final product of the invention, octene-(4)-dione-(2,7), itself an intermediate as noted above, the preparation of which would necessarily reduce the ultimate yield.

Accordingly, it has now been discovered that octene-(4)-dione-(2,7) can be obtained by a technically facile procedure at significantly and unexpectedly enhanced yields of more than 50 percent. This process involves reacting a propargyl metallic halide of the formula:

(I) $HC \equiv C-CH_2MX$ wherein M is a member selected from the group consisting of magnesium, zinc and ⅔ aluminum, and X is a member selected from the group consisting of chlorine, bromine, and iodine; with glyoxal or a derivative thereof of the formula:

(II) 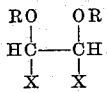

wherein R is a member selected from the group consisting of a hydrogen atom, or a straight, branched, cyclic lower alkyl or aryl radical; the straight alkyl moiety containing from 1 to 6 carbon atoms normally, e.g., methyl, ethyl, propyl, n-butyl, n-pentyl, n-hexyl; the branched alkyl moiety containing normally from 4 to 6 carbon atoms, e.g., isobutyl, isopentyl, 2,3-dimethylbutyl, 2-methylpentyl, 3-methylpentyl; and the cycloalkyl containing normally from 4 to 6 carbon atoms, e.g., cyclopentyl, cyclohexyl; the aryl radical is benzene or a lower alkyl substituted benzene radical wherein, preferably, each of the alkyl substituents are from 1 to 2 in number; each containing from 1 to 2 carbon atoms, e.g., tolyl, xylyl; and X has the value assigned above; to form the corresponding 4,5-dihydroxy, 4,5-dialkoxy, or 4,5-diaryloxy octadiyne-(1,7) of the formula:

(III) 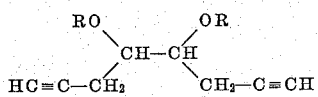

wherein R has the value defined above.

The initial reactant, the propargyl metallic halide, is prepared from magnesium, zinc, or aluminum and a propargyl halide in an organic solvent, preferably ether, e.g., diethyl ether, tetrahydrofuran, or mixtures of the two.

The other initial reactant, monomeric glyoxal or a derivative thereof as defined in Formula II above, in an organic solvent, e.g., ethers such as diethyl ether, tetrahydrofuran, aromatic or aliphatic hydrocarbons or mixtures thereof, which contains less than 0.5 mol of glyoxal or glyoxal derivative per mol of propargyl metal halide, is introduced into the solution of the latter compound. Where glyoxal is employed, the solvent solution thereof is cooled to −60° C., or as low as −70° C., and is added to the propargyl metal halide at a rate sufficient to allow the temperature to be maintained below 0° C. without difficulty, by external cooling. Temperature is not narrowly critical with the remaining glyoxal derivatives, so that for reaction of these latter compounds with propargyl metallic halide, the selected reaction temperature is such normally that the reaction takes place at once and the internal temperature is kept constant both by the rate of addition and by external cooling, or alternatively, the reactants are first added to each other at a low temperature, e.g., 0° C. to 30° C., and then warmed sufficiently to initiate the exothermic reaction and this latter temperature is maintained as, for example, between 25° C. to 70° C., by external cooling. The reaction mixture is, in either case, stirred for an additional period ranging from thirty minutes with glyoxal to sixty minutes with the various glyoxal derivatives.

The reaction mixture, when cooled, as, for example, by pouring onto a mixture of ice and water, is treated with an aqueous solution of an electrolyte; preferably those having an acidic reaction; for example, ammonium salts, organic acids, including alkylbenzene sulfonic acids, and particularly those containing from 1 to 2 lower alkyl substituents; and mineral acids, with sequential extraction of the organic fractions with ether, e.g., diethyl ether. Illustrative of the ammonium salts are the ammonium halides such as ammonium chloride; illustrative of the organic and mineral acids are p-toluenesulfonic acid and sulfuric acid, respectively. The electrolyte may, of course, be present in the ice and water to which the reaction product mixture is added, if desired. The solvent is then evaporated to leave the aforesaid octadiyne-(1,7) of the Formula III above which can be purified by distillation or recrystallization.

The octadiyne-(1,7) thus formed, that is octadiyne-(1,7)-diol-(4,5) or its corresponding derivative, as recited in Formula III above, is then dissolved in an aqueous organic acid, such as, for example, acetic acid or formic acid containing from 10 percent to 20 percent of water, catalytic amounts of sulfuric acid, e.g., .001 percent to .01 percent by weight of the organic acid present, and a soluble mercuric salt, e.g., mercuric sulfate acetate. The solution thus formed is admixed as, for example, by stirring, at a temperature of from 0° C. to 120° C. for a period of about one hour to five hours. The reaction mixture is thereafter added to ice or water and/or aqueous solutions of such electrolytes as ammonium salts and alkali metal carbonates, e.g., ammonium chloride, sodium hydrogen carbonate, sodium carbonate, and the organic fraction is then extracted with an organic solvent, e.g., ether, benzene, methylene chloride and chloroform. This reaction serves to hydrate the aforesaid diyne-(1,7) of Formula III to the corresponding dione-(2,7) of the formula:

(IV)
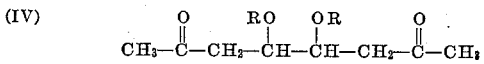

wherein R again has the value ascribed to it hereinabove. This product, a 4,5-dihydroxy, 4,5-dialkyloxy, or 4,5-diaryloxy octanedione-(2,7) remains, after removal of the solvent by evaporation, in vacuo, in the form of an oil which can be purified by distillation.

The aforesaid diynes and diones prepared as described herein are encompassed within the following structural formula:

(V)
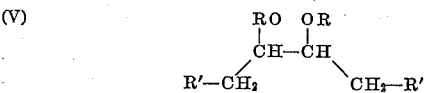

wherein R is as defined above; that is a member selected from the group containing a hydrogen atom, a straight, branched and cyclic lower alkyl radical and an aryl radical; and R' is a member selected from the group consisting of —V≡CH and

and provided that both of the moieties represented by R' are the same. Illustrative of these intermediate compounds are 4,5-diethoxyoctadiyne-(1,7); 4,5-dimethoxyoctadiyne - (1,7); 4,5-dihydroxyoctadiyne-(1,7); 4,5-diethoxyoctanedione - (2,7); 4,5 - dimethoxyoctanedione-(2,7); and 4,5-dihydroxyoctanedione-(2,7).

The dione of the aforesaid Formula IV above is then reacted to effect removal of the two oxygen-containing moieties, i.e., ROH, attached to the number 4 and 5 carbon atoms. This is accomplished by means of reagents having an alkaline or acidic reaction. For this purpose the glycol or derivative thereof, as defined in Formula IV, is reacted with a reagent having an alkaline or acidic reaction. For this purpose, the dione is dissolved in from three to twenty times its weight of a mixture of 70 percent to 90 percent of glacial acetic acid, from 5 percent to 15 percent of water, and from 5 percent to 15 percent of alkali metal acetate, e.g., sodium acetate, potassium acetate. Alternatively, said glacial acetic acid may be dissolved in three times to twenty times its weight of acetic anhydride which contains, in solution, 2 to 15 percent of anhydrous alkali metal acetate, e.g., sodium or potassium acetate. This solution is boiled under reflux for a period of from one hour to ten hours. It is also possible in a third alternative procedure to dissolve 4,5-dihydroxyoctanedione-(2,7) in from three to twenty times its weight of glacial acetic acid which contains catalytic amounts of a strong mineral or organic acid, e.g., concentrated sulfuric acid or an alkylbenzene acid as described hereinabove, and including ρ-toluenesulfonic acid. A further alternative involves dissolution of glacial acetic acid in from three to twenty times its weight of an aromatic hydrocarbon, e.g., benzene or toluene, which contains a catalytic amount of the aforesaid mineral or organic acid. The resulting solution is boiled for from one to twenty hours under reflux. The aforesaid solvents and acidic and basic catalysts are, of course, merely illustrative of those which can be employed ordinarily when employing such standard dehydration techniques.

The reaction mixture obtained is, in any event, cooled as, for example, by being poured onto ice, and octadiene-(3,5)-dione-(2,7) filtered therefrom with suction. The latter compound is thus precipitated and the aqueous-organic filtrate is shaken out several times with organic solvents (e.g., ether, benzene, methylene chloride, or chloroform). The organic fraction is then neutralized by admixture with an aqueous alkaline solution, e.g., an alkali metal carbonate such as sodium hydrogen carbonate or sodium carbonate. The solvent is evaporated and the residue of the crystalline octadiene-dione is separated from the liquid components thereof by filtration. The octadiene-(3,5)-dione-(2,7) thus obtained can, if desired, be purified by distillation or recrystallization.

This latter compound is in turn readily reduced to octene-(4)-dione-(2,7) by the procedure, for example, wherein the aforesaid octadiene-(3,5)-dione-(2,7) is hydrogenated in the presence of zinc and glacial acetic acid in pyridine, a technique described, for example, by P. Karrer et al., Helv. Chim. Acta, volume 32, p. 1934 (1949).

It is noted that the reaction product intermediates in each of the aforesaid process reaction steps may be employed in the crude state; that is, each intermediate need not be purified prior to its introduction into a subsequent reaction.

*Example 1*

A mixture of 60 parts by weight of propargyl bromide and 60 parts by volume of tetrahydrofuran are run into 9 parts by weight of aluminum, a trace of mercuric chloride, and 80 parts by volume of absolute tetrahydrofuran during 45 minutes, so that the internal temperature can readily be maintained at 30° C. by means of cooling with ice. The mixture is further stirred until the reaction has subsided. Stirring is then renewed for another hour at 25° C. to 30° C. with external warming.

A solution of 40 parts by weight of 1,2-dichloro-1,2-diethoxyethane in 80 parts by volume of tetrahydrofuran is run in at 0° C. Thereafter, the solution is heated to 40° C. to 45° C., the temperature then rising further owing to its own heat of reaction and being maintained at 50° C. by means of cooling with ice. The temperature decreases after about 45 minutes. The solution is then heated at 50° C. for another hour and then poured onto a mixture of ice and saturated ammonium chloride solution. It is extracted several times with ether, the organic phase is dried, and the solvent is removed in vacuo. The light brown, clear residue is distilled. There are obtained 36 parts by weight of 4,5-diethoxyoctadiyne-(1,7), an amount equal to 87 percent of the theoretical, B.P. 67° C.–70° C./0.1 mm. Hg, $n_D^{20}$=1.4530; the product solidifies in the refrigerator, M.P. 30° S. (mixture of stereoisomeric forms). The infra-red absorption spectrum exhibits characteristic bands at 3210 cm.$^{-1}$ (—C≡CH), 2100 cm.$^{-1}$ (monosubstituted C≡C group), 1945 cm.$^{-1}$ (allene group), and at about 1100 cm.$^{-1}$ (ether band).

*Analysis.*—$C_{12}H_{18}O_2$ (molecular weight=194): Calc.—C=74.20%; H=9.33%; O=16.47%. Found.—C=74.45%; H=9.30%; O=16.48%.

333 parts by weight of 4,5-diethoxyoctadiyne-(1,7) are run, with stirring, into a solution of 15 parts by weight of basic mercuric sulfate, 1500 parts by weight of 85% formic acid, and 2.5 parts by volume of concentrated sulfuric acid during 40 minutes; the temperature is maintained at 0° C. by cooling. The mixture is further stirred for 3 hours altogether, the temperature being allowed to rise to 20° C. The reaction solution is poured onto an ice-water mixture, and the resultant aqueous solution is extracted 5 times by shaking with portions, each of 300 parts by volume, of methylene chloride. The organic phase is washed with sodium hydrogen carbonate solution until neutral. It is then dried and the solvent is removed in vacuo. Distillation produces 363 parts by weight (equal to 91% of the theoretical) of 4,5-diethoxyoctanedione-(2,7) in the form of a colorless liquid, with B.P. 100° C.–110° C./0.05 mm. Hg. The infrared absorption spectrum exhibits the band at 1720 cm.$^{-1}$ characteristic for saturated aliphatic ketones, as well as another at 1100 cm.$^{-1}$ which can be ascribed to the ether group. The bands at 3210 cm.$^{-1}$, 2100 cm.$^{-1}$, and 1945 cm.$^{-1}$ are missing.

Analysis.—$C_{12}H_{22}O_4$ (molecular weight=230): Calc.—C, 62.58%; H, 9.63%. Found.—C, 62.56%; H, 9.16%.

Ten parts by weight of 4,5-diethoxyoctanedione-(2,7) are added to a solution of 100 parts by volume of glacial acetic acid, 5 parts by volume of water, and 10 parts by weight of sodium acetate, and after addition of a trace of hydroquinone, they are heated to boiling under reflux for 5 hours. The solution is then poured onto ice and shaken out with methylene chloride. The organic fraction is neutralized with a saturated solution of sodium hydrogen carbonate, washed with water, dried, and concentrated in vacuo. The residue is filtered off with suction and washed with petroleum ether. There are obtained 5.1 parts by weight of octadiene-(3,5)-dione-(2,7), equal to 85% of the theoretical B.P. 90° C./0.01 mm. Hg, M.P. 125° C.–127° C. The ultraviolet absorption spectrum exhibits a band at 276 m$\mu$ ($\epsilon$=34,500).

Five parts by weight of octadiene-(3,5)-dione-(2,7) are dissolved in 50 parts by volume of pyridine and 10 parts by volume of glacial acetic acid, and treated with 5 parts of weight of zinc dust, while cooling with ice. The mixture is shaken for 15 minutes, the temperature not being allowed to exceed 25° C. The mixture is filtered and treated with ice and dilute sulfuric acid until the solution has an acidic reaction. The organic fraction is extracted with methylene chloride. The organic phase is washed until neutral, dried, and the solvent is removed in vacuo. There remain 3.8 parts by weight (equal to 75% of the theoretical) of octene-(4)-dione-(2,7), M.P. 34–35° C. (after recrystallizing once from ether/petroleum ether).

*Example 2*

The compound, 4,5-dimethoxyoctadiyne-(1,7) is prepared in the manner described in Example 1; 1,2-dichloro-1,2-dimethoxyethane being substituted for 1,2-dichloro-1,2-diethoxyethane therein; and the reaction being carried out at 70° C. The yield is 91% of the theoretical. The substance solidifies in the refrigerator, M.P. at 25° C. (not sharp); B.P. 88° C.–90° C./12 mm. Hg; $n_D^{20}$=1.4623. The infra-red absorption spectrum exhibits bands at 2380 cm.$^{-1}$(—C≡CH), 2100 cm.$^{-1}$ (monosubstituted acetylene group), 1950 cm.$^{-1}$ (allene group), and 1100 cm.$^{-1}$ (C—O—C band).

The compound, 4,5-dimethoxyoctadione-(2,7), is also prepared in a manner corresponding to that employed in the preparation of 4,5-diethoxyoctadione-(2,7) and described in Example 1. The product, 4,5-dimethoxyoctane-(2,7), is obtained in a yield of 82% of the theoretical, B.P. 85° C.–93° C./0.08 mm. Hg. The infra-red absorption spectrum indicates the band at 1720 cm.$^{-1}$ characteristic for saturated aliphatic ketones as well as another at 1100 cm.$^{-1}$ which can be ascribed to the ether group. The bands at 3280 cm.$^{-1}$, 2100 cm.$^{-1}$ and 1950 cm.$^{-1}$ are missing.

Analysis.—$C_{10}H_{18}O_4$ (molecular weight=202): Calc.—C=59.40%; H=8.97%. Found.—C=59.75%; H=8.86%.

Octadiene-(3,5)-dione-(2,7) is prepared in a manner similar to that described in Example 1, 4,5-dimethoxy-octanedione-(2,7) being substituted for 4,5-diethoxy-octanedione-(2,7) therein; the yield of diene product being 79% of the theoretical with the same physico-chemical properties as recited in Example 1.

Octene-(4)-dione-(2,7) is prepared, in turn, from octadiene-(3,5)-dione-(2,7) in the manner described in Example 1.

*Example 3*

Nine parts by weight of monomeric glyoxal, prepared as described by C. Harries and P. Temme, Ber. 40, 165 (1907), are dissolved in 200 parts by volume of absolute ether, which has been cooled to −60° C., and are filled into a dropping funnel cooled externally with a cooling mixture chilled to −60° C. to −70° C. This solution is allowed to flow, during 15 minutes, into a solution of propargyl magnesium bromide cooled to 0° C., this having been prepared from 14.4 parts by weight of magnesium and 80 parts by weight of propargyl bromide in 200 parts by volume of absolute ether. Thereafter, it is stirred at 0° C. for yet another half hour. The yellow solution is poured onto a mixture of ice and saturated ammonium chloride solution. The organic fractions are extracted with ether. The ether solution is washed until neutral, dried, and concentrated in vacuo. There remain 16 parts by weight (equal to 76% of the theoretical) of the light brown crystalline 4,5-dihydroxyoctadiyne-(1,7) which is purified by distillation in a high vacuum (B.P. 80° C.–100° C./0.04 mm. Hg). Colorless crystals, M.P. 60° C.–70° C. (probably a mixture of the meso and the d,l forms), are formed. The infra-red absorption spectrum exhibits characteristic bands at 3500 cm.$^{-1}$ (for OH groups), 3320 cm.$^{-1}$ (for —C≡CH), 2110 cm.$^{-1}$ (mono-substituted C≡CH group), and 1970 cm.$^{-1}$ (allene group).

Analysis.—$C_8H_{10}O_2$ (molecular weight=138): Calc.—C=69.44%; H=7.30%. Found: C=69.19%; H=7.33%.

Nine parts by weight of 4,5-dihydroxyoctadiyne-(1,7) are added, by small portions, at 0° C. to a solution of 1.25 parts by weight of basic mercuric sulfate, 0.2 part by volume of concentrated sulfuric acid, and 120 parts by volume of 85% formic acid. Cooling is then suspended, and the solution is stirred for another three hours at room temperature. The mixture is poured onto ice, and extracted by shaking several times with methylene chloride; the organic phase is thereafter neutralized with sodium hydrogen carbonate solution, rinsed with water, and dried. After the solvent has been evaporated in vacuo, the residue is distilled. There are obtained 7.6 parts by weight of 4,5-dihydroxyoctanedione-(2,7) in the form of a pale yellow oil; B.P. 70° C.–110° C. (air bath temperature 0.001 mm. Hg. The infra-red absorption spectrum exhibits bands at about 3450 cm.$^{-1}$ (OH group, wide, relatively weak) and at 1723 cm.$^{-1}$ (carbonyl group).

A solution of 35 parts by volume of acetic acid, 2 parts by volume of water, 4 parts by weight of sodium acetate, and 3.5 parts by weight of 4,5-dihydroxyoctanedione-(2.7) is treated with a trace of hydroquinone and heated to boiling under reflux in nitrogen for five hours. After cooling, it is poured onto an ice/water mixture and extracted by shaking several times with methylene chloride; the organic phase is washed with sodium hydrogen carbonate solution until neutral and dried. After the solvent has been evaporated, there remains a crystal and oil mixture, which is distilled. The distillate is filtered off with suction, and the crystalline fraction washed with petroleum ether. The octadiene-(3,5)-dione-(2,7) thus obtained solidifies at 120° C.–123° C. and, in respect of its physico-chemical properties, it is identical with the product obtained according to Example 1. Octene-(4)-dione-(2,7) is prepared therefrom in the manner described in Example 1.

What is claimed is:
1. A compound of the formula:

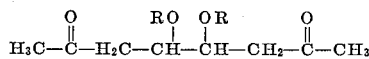

wherein R is selected from the group consisting of hydrogen, straight, branched and cyclic lower alkyl and benzene and lower alkyl-substituted benzene.
2. The compound, 4,5-diethoxyoctanedione-(2,7).
3. The compound, 4,5-dimethoxyoctanedione-(2,7).
4. The compound, 4,5-dihydroxyoctanedione-(2,7).

References Cited by the Examiner
UNITED STATES PATENTS
2,904,593  9/1959  Robeson et al. ____ 260—594 X OTHER REFERENCES
Milas et al., J. Am. Chem. Soc., vol. 70, pp. 2862–3 (1948)
"Organic Synthesis," vol. 2, Migridichian (1960), pp. 1022 and 1026.
Wagner et al. Synthetic Organic Chemistry, pp. 32–5, 40–1 and 231–2 (1953).

LEON ZITVER, *Primary Examiner.*

L. A. WEINBERGER, W. B. LONE, D. D. HORWITZ, M. JACOB, *Assistant Examiners.*